(12) United States Patent
Roberts, III et al.

(10) Patent No.: US 8,073,971 B2
(45) Date of Patent: Dec. 6, 2011

(54) MESSAGE BASED NETWORK CONFIGURATION OF DYNAMIC DOMAIN NAME SERVICES

(75) Inventors: Theodore H Roberts, III, Sammamish, WA (US); Kevin T Damour, Bellevue, WA (US); Leszek Mazur, Bellevue, WA (US); Lingan Satkunanathan, Kirkland, WA (US); Scott A Manchester, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/009,807

(22) Filed: Dec. 10, 2004

(65) Prior Publication Data

US 2006/0129503 A1 Jun. 15, 2006

(51) Int. Cl.
*G06F 15/16* (2006.01)
*G06F 15/177* (2006.01)

(52) U.S. Cl. ......... 709/245; 709/227; 709/228; 709/229

(58) Field of Classification Search .................. 709/245, 709/227, 228, 229; 370/257; 726/15
See application file for complete search history.

(56) References Cited

U.S. PATENT DOCUMENTS

| 5,634,011 | A | | 5/1997 | Auerbach et al. | |
| 5,790,548 | A | * | 8/1998 | Sistanizadeh et al. | 370/401 |
| 6,009,103 | A | * | 12/1999 | Woundy | 370/401 |
| 6,028,848 | A | * | 2/2000 | Bhatia et al. | 370/257 |
| 6,108,703 | A | * | 8/2000 | Leighton et al. | 709/226 |
| 6,151,628 | A | * | 11/2000 | Xu et al. | 709/225 |
| 6,154,738 | A | | 11/2000 | Call | |
| 6,338,082 | B1 | | 1/2002 | Schneider | |
| 6,393,271 | B1 | * | 5/2002 | Dougherty | 455/411 |
| 6,418,467 | B1 | * | 7/2002 | Schweitzer et al. | 709/223 |
| 6,427,170 | B1 | * | 7/2002 | Sitaraman et al. | 709/226 |
| 6,430,276 | B1 | * | 8/2002 | Bouvier et al. | 379/121.01 |
| 6,434,600 | B2 | * | 8/2002 | Waite et al. | 709/206 |
| 6,442,602 | B1 | * | 8/2002 | Choudhry | 709/218 |
| 6,577,643 | B1 | * | 6/2003 | Rai et al. | 370/466 |
| 6,603,758 | B1 | * | 8/2003 | Schmuelling et al. | 370/352 |
| 6,628,934 | B2 | * | 9/2003 | Rosenberg et al. | 455/411 |
| 6,675,208 | B1 | * | 1/2004 | Rai et al. | 709/224 |
| 6,678,717 | B1 | * | 1/2004 | Schneider | 709/203 |
| 6,701,329 | B1 | * | 3/2004 | Esibov et al. | 1/1 |
| 6,721,306 | B1 | * | 4/2004 | Farris et al. | 370/352 |
| 6,732,176 | B1 | * | 5/2004 | Stewart et al. | 709/227 |
| 6,769,031 | B1 | * | 7/2004 | Bero | 709/245 |
| 6,862,444 | B2 | | 3/2005 | Karaoguz et al. | |
| 6,876,667 | B1 | | 4/2005 | Synnestvedt et al. | |
| 7,028,183 | B2 | * | 4/2006 | Simon et al. | 713/168 |

(Continued)

OTHER PUBLICATIONS http://searchsecurity.techtarget.com/sDefinition/0,,sid14_gci884946,00.html.*

(Continued)

*Primary Examiner* — Evens J Augustin
(74) *Attorney, Agent, or Firm* — Workman Nydegger

(57) ABSTRACT

Systems and methodologies that facilitate hosting of a domain name and access of users to the Internet, by using a well defined protocol to interact with a plurality of Dynamic Domain Name Service (DDNS) providers, via employing; a purchasing component and a status verifying component. Once a user has selected a domain name, the purchasing component can automatically query the provider(s) for terms of the service plan to host such domain name associated with dynamic IP addresses. The status verifying component can verify the IP address of the end user machine and supply it to the DDNS, to manage in-bound traffic to the user's domain name.

13 Claims, 10 Drawing Sheets

U.S. PATENT DOCUMENTS

| | | | |
|---|---|---|---|
| 7,188,179 B1* | 3/2007 | Hanson et al. | 709/227 |
| 7,194,552 B1 | 3/2007 | Schneider | |
| 2002/0029275 A1* | 3/2002 | Selgas et al. | 709/227 |
| 2003/0041091 A1* | 2/2003 | Cheline et al. | 709/200 |
| 2003/0145227 A1* | 7/2003 | Boden | 713/201 |
| 2003/0200321 A1* | 10/2003 | Chen et al. | 709/229 |
| 2003/0212660 A1 | 11/2003 | Kerwin | |
| 2004/0098375 A1 | 5/2004 | DeCarlo | |
| 2004/0172463 A1 | 9/2004 | King et al. | |
| 2005/0149454 A1 | 7/2005 | Chen et al. | |
| 2006/0015716 A1 | 1/2006 | Thornton et al. | |
| 2006/0031330 A1 | 2/2006 | Ruiz | |
| 2006/0059346 A1 | 3/2006 | Sherman et al. | |
| 2006/0088026 A1 | 4/2006 | Mazur et al. | |
| 2006/0101155 A1 | 5/2006 | Damour et al. | |

OTHER PUBLICATIONS

U.S. Appl. No. 11/009,641, Satkunanathan, et al.

VeriSign, "VeriSign Web site—SSL Certificates," Certificates, Dec. 30, 2003, http://web.archive.org/web/20040708073501/verisign.com/products/site/index.html?sl=070302.

WhichSSL, VVhichSSL.com Website, "SSL Certificate Comparison—Screen Shot," Jun. 26, 2004, http://web.archive.org/web/20040626044120/www.whichssl.com/ssl-certificate-comparison.html.

Office Action dated Apr. 28, 2008 cited in U.S. Appl. No. 11/009,641.
Office Action dated Feb. 12, 2009 cited in U.S. Appl. No. 11/009,641.
Office Action dated Aug. 11, 2009 cited in U.S. Appl. No. 11/009,641.
Office Action dated Sep. 14, 2009 cited in U.S. Appl. No. 10/974,182.
Office Action dated Mar. 25, 2008 cited in U.S. Appl. No. 10/985,177.
Office Action dated Feb. 26, 2009 cited in U.S. Appl. No. 10/985,177.
Office Action dated Jul. 9, 2009 cited in U.S. Appl. No. 10/985,177.
Notice of Allowance dated Dec. 14, 2009 cited in U.S. Appl. No. 10/985,177.
U.S. Appl. No. 10/985,177, filed Mar. 22, 2010, Notice of Allowance.
Entrust, Entrust Web site, Entrust Certificate Services—Screen Shot, Jul. 1, 2004. http://web.archive.org/web/20040619151540/www.entrust.com/certificate_services/web_pricing.htm.
OA dated Sep. 23, 2008 for U.S. Appl. No. 11/009,641, 23 pages.
OA dated Jan. 16, 2009 for U.S. Appl. No. 10/974,182, 33 pages.

* cited by examiner

MESSAGE BASED NETWORK CONFIGURATION OF DYNAMIC DOMAIN NAME SERVICES

TECHNICAL FIELD

The subject invention relates generally to purchase, set up and configuration of Dynamic Domain Name Services (DDNS) for networks and servers, and more particularly to systems and methods that facilitate purchase, remote configuration and maintenance of DDNS providers that host a domain name, via a structured messaging format and protocol.

BACKGROUND OF THE INVENTION

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example.

At the same time, the rapid growth of the Internet and Internet based applications has created a multitude of benefits for businesses, such as ease of marketing and sales to clients. In such environments, the Domain Name Service (DNS) allows potential clients to key a URL (Uniform Resource Locator) or domain name into the address line of their browser and access a corresponding server/computer of the business.

In general, a Domain Name Service (DNS) includes distributed set of servers primarily used by internet applications to lookup the network address of a given internet server. For example, an internet application that requires looking up a server name initially can send a DNS query to a local Domain Name server (LDNS), which may be located at the same site. The LDNS can also maintain a cache of resource records, for example, mappings between server names and IP addresses. To facilitate mnemonic identification of destination computer systems, a Domain Name Service (DNS) can typically translate a unique textual name for a destination computer system into the IP address for that computer. The textual name is called a "fully qualified domain name."

As such, the basic function of DNS is to provide a distributed database that maps between human-readable host names and IP addresses. The DNS name space can be hierarchically organized so that sub domains can be locally administered. The root of the hierarchy can be centrally administered and served from a collection of root servers. In addition, sub domains can be delegated to other servers that are authoritative for their portion of the name space, and such process can be repeated recursively.

A Dynamic Domain Name Service (DDNS) serves a similar purpose to DNS, in that it maps Internet domain names to IP addresses. Yet, unlike DNS that only works with static IP addresses, DDNS works with dynamic IP addresses, such as those assigned by an ISP or other Dynamic Host Configuration Protocol (DHCP) server.

For example, DDNS is typically popular with home networkers who in general receive dynamic, frequently changing IP addresses from their service provider. Also, if a user connects to the Internet via DSL, cable modem, or any other method whereby the IP address might change periodically, and the user runs some type of internet service (ftp, chat, or webserver) via such connection, then a DDNS can be employed. As such DDNS can allow machines with IP addresses that change to have permanent domain names on the Internet. Compared to ordinary DNS, DDNS may require additional host software, as well as maintaining additional potential failure points on the network, and the like. Overall, DDNS allows machines with IP addresses that change to have permanent addresses or domain names on the Internet.

An example of a domain name can be "www.Microsoft.com", wherein, "www" indicates World-Wide Web, "Microsoft" indicates an example of a company name, .com indicates commercial (as opposed to .gov for government entities, .edu for education entities, .org for non-profit organizations, and the like). Likewise, progressing from right to left, the host name can be structured from general to very specific. For example, "com" can typically be referred to as a top-level domain name, "Microsoft" is sometimes referred to as a second-level domain name, and "www" can designate the server that handles Internet requests, and is sometimes referred to as the host name. This structure allows reuse of names within different hierarchies.

Likewise, an example of a URL is "http://www.Microsoft.com/1.gif", where the "http://" indicates the type of protocol and the last field, "1.gif", indicates a file name, but may also be a Web page, executable application, or other computer readable or executable file located at the URL that the user wishes to access.

When the user enters the URL into a browser, the browser can make a determination as to whether it knows the corresponding IP (Internet Protocol) address. For example, a corresponding IP address for "Microsoft.com" may be 207.46.130.108. The browser knows the corresponding IP address if that host name has been visited recently and the address is still in a short-term host name address table in the browser.

At the same time, generally, required steps for an internet presence includes purchasing a domain name and configuration of the DNS or DDNS services and the like. Such numerous steps can typically include cumbersome procedures, such as manual configuration, which can be susceptible to errors. In addition, some users (e.g., small business owners) may be unfamiliar with such procedures and may require expert help that can be time consuming and increase users' set up costs.

For example, before a small business can initiate a presence electronically on the Internet and the World Wide Web, such a business is often required to purchase a domain name from a Domain Name Registrar and then host the corresponding DNS information with a DNS (or a DDNS) provider. To do so, a representative of the small business can be required to initiate communication (e.g., via telephone, fax, mail and the like) with a representative of the DNS provider in order to establish an account therewith. During such communication, the DNS representative is provided with general information (e.g., name, address, business type and the like) and a form of payment (e.g., a credit card number). In return, the DNS provider can supply the user with a username and password that can be employed to authenticate the user and authorize presence of the domain name on the Internet. Hence, the different presentation of the plan options offered by the various DNS providers can be confusing to a user and require cumbersome registration steps.

Moreover, each provider of DNS hosting service can require loading and implementing specialized proprietary software/procedures that can further complicate matters, and impede a user's ability to accurately compare plans offered by DNS providers. Such disparate configuration tools can thwart users from employing opportunities provided by the Internet to their full potentials. For example, the DNS provider can send, via a postal or other delivery service, proprietary software (e.g., configuration software) that may need to be installed on a computer system prior to hosting the domain name by the DNS provider. Any such associated software and/or hardware must be correctly installed on the computer system, in order for the user of small business to enjoy benefits of a domain name and thereby presence on the Internet. Thus, such a user is generally required to wait until such software and hardware is received. Thereafter, the user must correctly install the associated software and/or hardware at the computer system to enable Internet presence.

If correctly installed, a user can configure inbound traffic, and interact with the DNS provider. In order to support secure web traffic, the user must also obtain proper certificate provisions via third parties for the domain name of the user. Obtaining such certificate can further add to the complexities of establishing presence on the Internet.

Thus and as explained above, users wishing to enjoy presence of their domain names on the Internet can typically be subjected to: non-uniform presentations in a multi vendor environment, cumbersome contacting requirements, waiting periods for appropriate access software and/or hardware to be delivered or installed.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods that facilitate hosting of a domain name and presence of users on the Internet, by using a schema that operates between an end user machine and a plurality of Dynamic Domain Name Service (DDNS) providers, wherein the schema employs; a purchasing component and a status verifying component. The purchasing component can further include various sub components that characterize the DDNS providers' offered term of sale for service agreement of hosting the domain name, such as; billing, plan selection, renewal, promotional calls, and the like. Likewise, the status verifying component can facilitate verification of status for the IP address of an end user machine during its on going change, and supplying the updated IP address to the DDNS provider, to resolve the domain name to the new IP address. Accordingly, there typically exists no fixed mapping to an IP address, and such address can change dynamically.

In accordance with an aspect of the subject invention, a plurality of third party DDNS providers can register and receive a standardized set of messages for hosting a domain name(s) obtained by a user. Such standard messages can provide a user with a uniform presentation of various plans offered by the plurality of the DDNS providers, wherein the user can then select a desired plan therefrom for hosting the domain name. The standardized messages can be for example in a form of XML (Extensible Markup Language).

The invention thus facilitates initial server configurations (e.g., presence of small businesses on the Internet), and on-going maintenance, wherein employing multi vendor components are simplified by using a unified and common message structure. The unified and common message structure can be used by a plurality of end user networked devices, such as stand alone routers, window servers, and the like, when interacting with third party DDNS providers. Such can further simplify configurations, for example during installation of operating systems.

According to a methodology of the subject invention, once a user has selected a domain name, the purchasing component can automatically query the DDNS provider(s) for terms of the service plan to host such domain name. The terms can include; duration for hosting the domain name, additional optional services such as back mail and/or smart host relaying, price, terms of payments and the like. Subsequently, a response to such query can be received by the end user machine. A billing query can automatically then be prepared and submitted to the DDNS provider(s). Next, the DDNS provider(s) can provide a billing response that outlines the service agreement terms for hosting such domain name. The received response can then be displayed to a user, via a uniform presentation such that a user enjoys a similar experience, regardless of which DDNS provider the user interacts with. Next, the user can elect a desired plan to initiate internet presence.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

Figure 1:
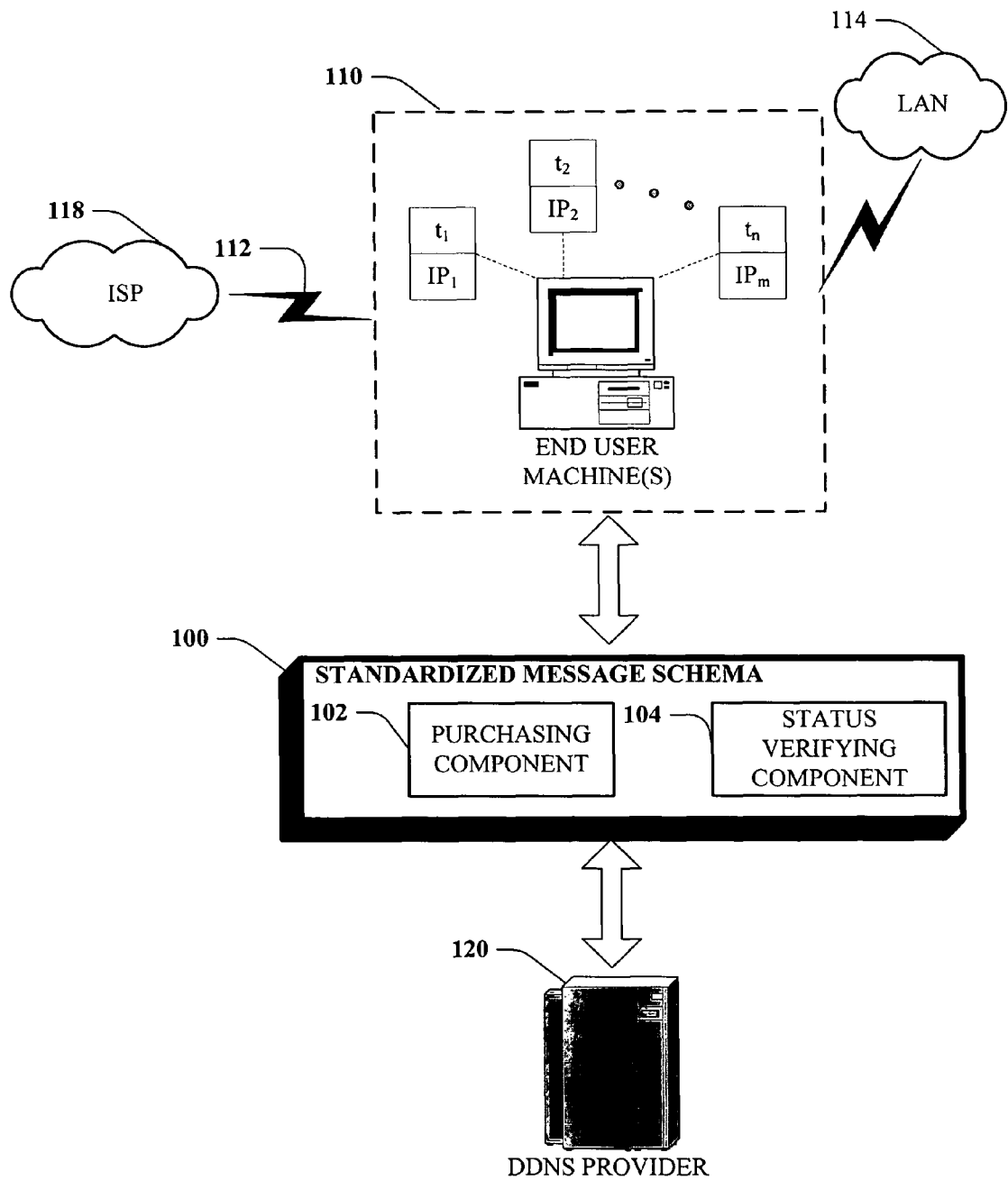
FIG. 1 illustrates a schematic block diagram of components associated with a messaging schema exchanged between an end user machine having changing IP addresses, and a Dynamic Domain Name Service (DDNS) provider, in accordance with an aspect of the subject invention.

Appendix A presented infra provides one particular exemplary set of schema in accordance with an aspect of the subject invention—this appendix is to be considered part of this specification describing the invention.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for a standardized messaging schema that facilitates hosting of a domain name, and presence of a user with changing IP addresses on the Internet, by using a well defined protocol to interact with a plurality of Dynamic Domain Name Service (DDNS) providers, via employing; a purchasing component and a status verifying component. Such a messaging schema can further provide for a uniform presentation of various hosting plans offered by a plurality of Dynamic Domain Name Service (DDNS) providers, and thus a user can enjoys a similar experience, regardless of which DDNS provider the user interacts with.

Referring initially to FIG. 1, a block diagram of a messaging protocol 100 for interaction between an end user machine 110 and Dynamic Domain Name Service (DDNS) provider(s) 120 is illustrated. Such messaging protocol 100 can include a purchasing component 102 and a status verifying component 104, which are part of a standardized set of messages transferred between the DDNS provider(s) 120 and an end, user device 110.

The end user machine 110 can be assigned a changing IP address by the Internet Service Provider (ISP) 118 at various periods. For example, at time $t_1$ the IP address for the end user 110 can be $IP_1$, and at time $t_n$ (n being an integer) the ISP can assign another address $IP_m$ (where m is an integer) to the end user machine 110. The end user machine can be a personal computer, server, workstations, personal digital assistant, and the like. In addition, the end user machine 110 can also be an Internet Connection Sharing Device (ICSD) that facilitates sharing a connection from a local area network 114 to the Internet supplied by the ISP 118. Accordingly, the end user machine 110 can be a computer executing a process that facilitates time-sharing of the Internet connection, for example. The internet connection supplied by the ISP can be, for example, a modem connection, a DSL connection and/or a wireless connection. In addition, the local network 114 can be, for example, an Ethernet LAN, a token ring LAN, or other LAN. Although the invention is primarily described within the context of an end user machine 110 that communicates with a Dynamic Domain Name Service (DDNS) provider 120, it is to be appreciated that the network 114 can also include a Wide Area Network (WAN). Moreover, the network 114 can include hardwired and/or optical and/or wireless connection paths. The connection 112 can be shared among a plurality of devices connected to the network 114. Such devices can include, personal computers, workstations, televisions and telephones, for example. Sharing of the connection 112 facilitates reducing the cost of one or more of the LAN devices, and can reduce the complexity of managing the network 114 and optimizes the throughput of the connection 112.

The DDNS provider 120 can maintain a link of the domain name for the end user 110 to its changing IP address, such that each time the IP address provided by the ISP changes, then the status verifying component 104 detects this change and updates the DDNS database to reflect such change in the IP address. In general the DDNS provider 120 can provide access to a distributed Internet directory service (not shown), and supply translation between domain names specified by the user with the dynamic IP addresses, to control in bound traffic (e.g., Internet email delivery). Typically, if the dynamic IP address is not communicated to the DDNS 120, web sites cannot be located and email delivery stalls.

Once the DDNS 120 provider registers to receive the standardized messages of the subject invention, a user can select such provider to offer plans for hosting the domain name selected by the user and provide service to its dynamic IP address. Each plan can have a plurality of terms and conditions such as, duration, price and the like associated therewith. Moreover, the status verifying component 104 can contact the DDNS provider 120 each time the IP address provided by the ISP 118 changes, to update the DDNS database and reflect the change in the IP address. Thus, even though a domain name's IP address for the end user machine 110 can change often, requests from clients associated with the end user can still be forwarded to the designated domain name.

Figure 2:
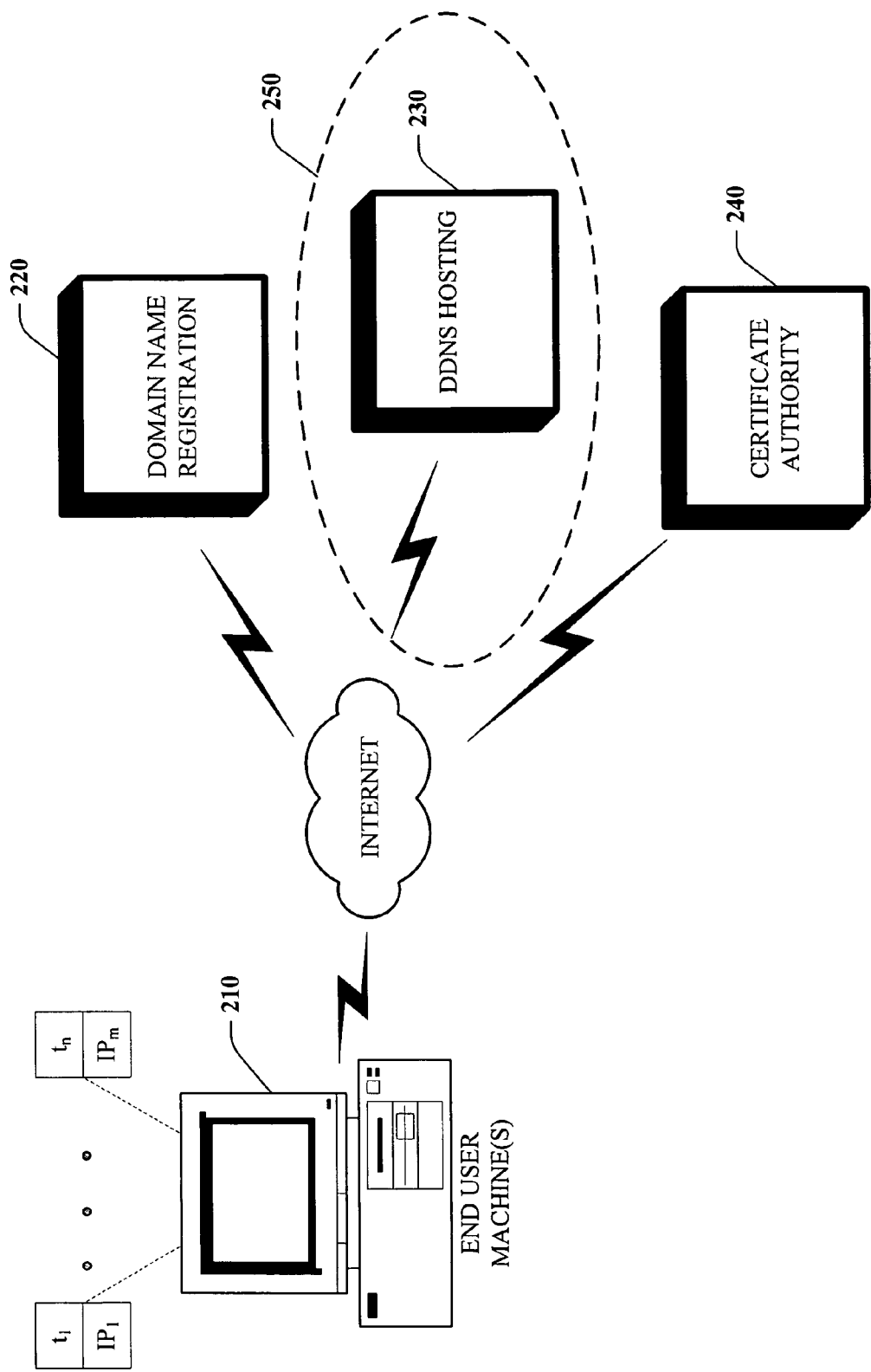
FIG. 2 illustrates a schematic diagram of providing an end user presence on the Internet via employing a multi-vendor component.

FIG. 2 illustrates a schematic diagram of providing an end user presence on the Internet via employing a multi vendor component, wherein the subject invention primarily addresses the interaction 250 between an end user machine, such as a machine 210 (i.e., small business computer) and a DDNS hosting 230. The end user machine 210 can interact with a plurality of vendors 220, 230, and 240 via the Internet. Vendor 220 can primarily supply the end user with a domain name such as "mybusiness.com.", and manages the various aspects of domain name registration. Upon obtaining such domain name, the end user 210 can then seek and interact with various DDNS providers 230 for hosing such domain name, as illustrated by the interaction at 250. During the interaction 250 a set of standardized messages, for example in the form of XML messages, are automatically exchanged between the end user machine 210 and the DDNS provider 230. The IP address of an end user machine 210 changes dynamically and the standardized message schema of the subject invention supplies the new IP address to the DDNS provider 230, to resolve the domain name to such new IP address. Such standardized message schema can further provide a user with a uniform presentation of various plans offered by the plurality of the DDNS providers 230, such that the user can then select a desired plan therefrom.

Similarly, vendor 240 can manage certificate authority and authenticating technologies such as Transport Layer Security (TLS) encryption with the domain name web site to verify validity (e.g., the website is trusted). Such technologies can verify a web site via ensuring the website is associated with a valid (e.g., signed) web site certificate. Generally, the web site certificate can provide web site identification, such as the web site's publisher, and can be employed to match a web site publisher with the certificate. When a match is successful, the web client is typically provided access to the web site. Accordingly, a user enjoys a similar experience, regardless of which DDNS provider the user interacts with.

Figure 3:
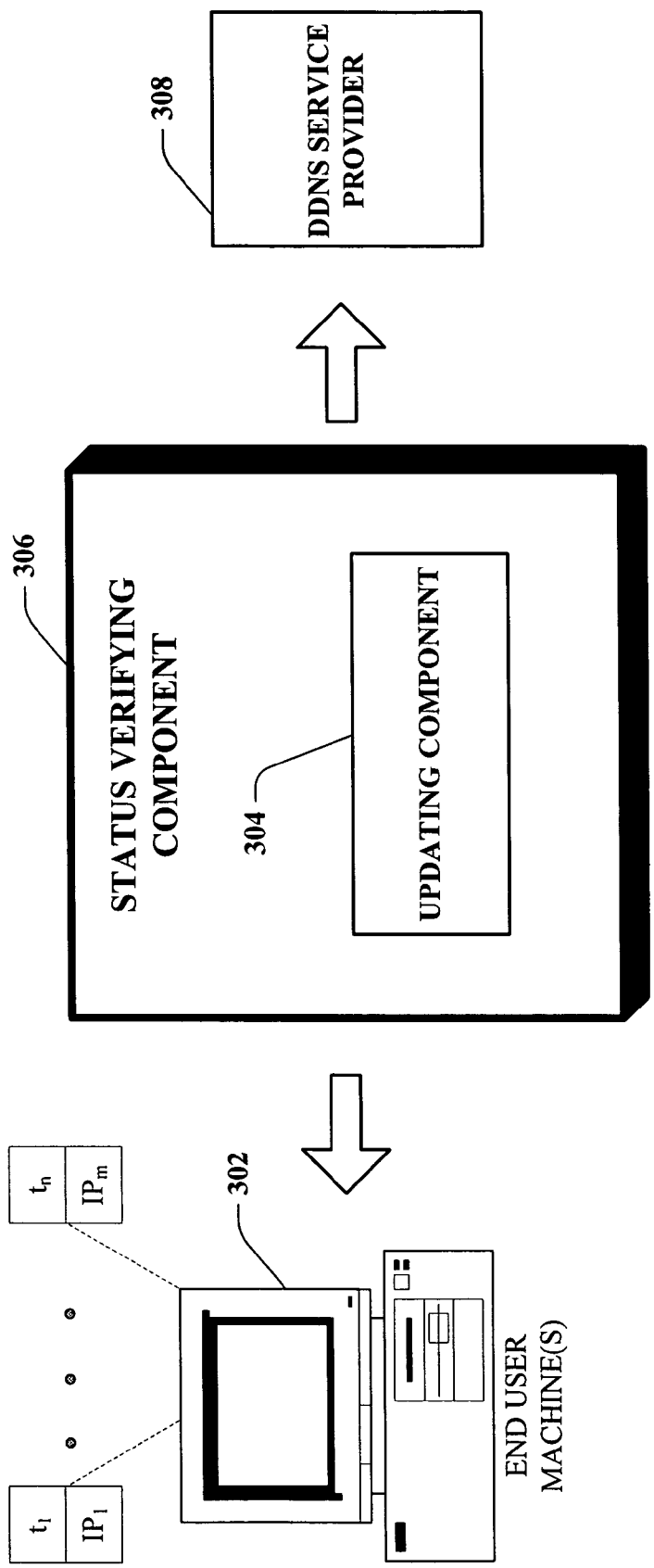
FIG. 3 illustrates a sub component associated with the status verifying component in accordance with an aspect of the subject invention.

Referring now to FIG. 3 an updating component 304 that can be associated with the status verifying component 306 is illustrated. Typically, there exists no fixed mapping to the IP address of the end user machine 302, and as such IP address can change dynamically from $IP_1$ to $IP_m$ (m being an integer) during various time intervals $t_1$ thru $t_n$ (where n is an integer). The status verifying component 306 can include an updating component 304, which can periodically electronically contact or ping/update the DDNS 308 every time a new IP address is assigned to the end user machine 302 by an ISP (not shown). Thus, even though a domain name's IP address for the end user machine 302 can change often, the DDNS provider 308 can maintain a link of the domain name for the end user 302 to its changing IP address, and requests from clients associated with the end user can still be forwarded to the domain name.

Figure 4:
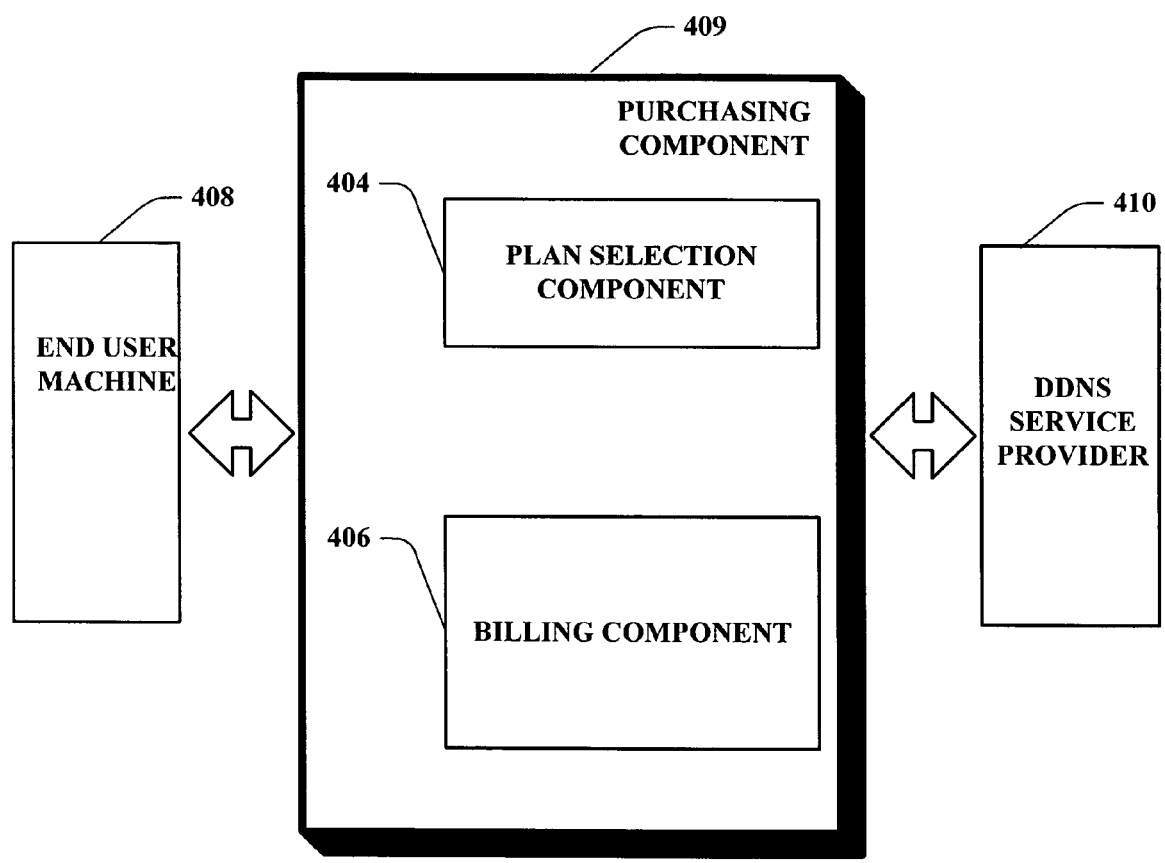
FIG. 4 illustrates yet another schematic block diagram of a purchasing component in accordance with the subject invention.

Referring now to FIG. 4 various sub components that can be associated with the purchasing component 409 are illustrated. Such purchase component 409 can further include a plan selection component 404 and a billing component 406. The purchasing component 409 can query the DDNS service provider 410 for a list of plan offerings and terms of the service agreement that are associated with the plan selection component 404. Such can include: the duration of hosting the domain name previously obtained by the user, whether a transfer of the domain name is required from another DDNS provider, designation of the DDNS provider, identification of the top level domain name (TLD), a language hint that designates to the DDNS provider 410 what language the server can employ, renewal options, optional services that augment DDNS (e.g. smart relaying for outbound mail and backup mail services for inbound mail), promotional calls and the like.

An exemplary schema that can define an expression of shared vocabulary between the end user machine 408 and DDNS provider 410 is presented at the end of this document, as part of appendix A. Such exemplary schema can for example be in form of an Extensible Markup Language (XML) that can define and describe a class of XML documents using schema constructs of an XML schema language. These schema constructs can be used to constrain and document the meaning, usage, and relationships of data types, elements and their content, attributes and their values, entities, contents, and notations, as used in XML documents. Thus, in general any computer system that can access an XML schema can process XML documents in accordance with the XML schema. Furthermore, typically any computer system that can access an XML schema can compose or modify XML documents for use by other computer systems that can also access the XML schema. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema.

Figure 5:
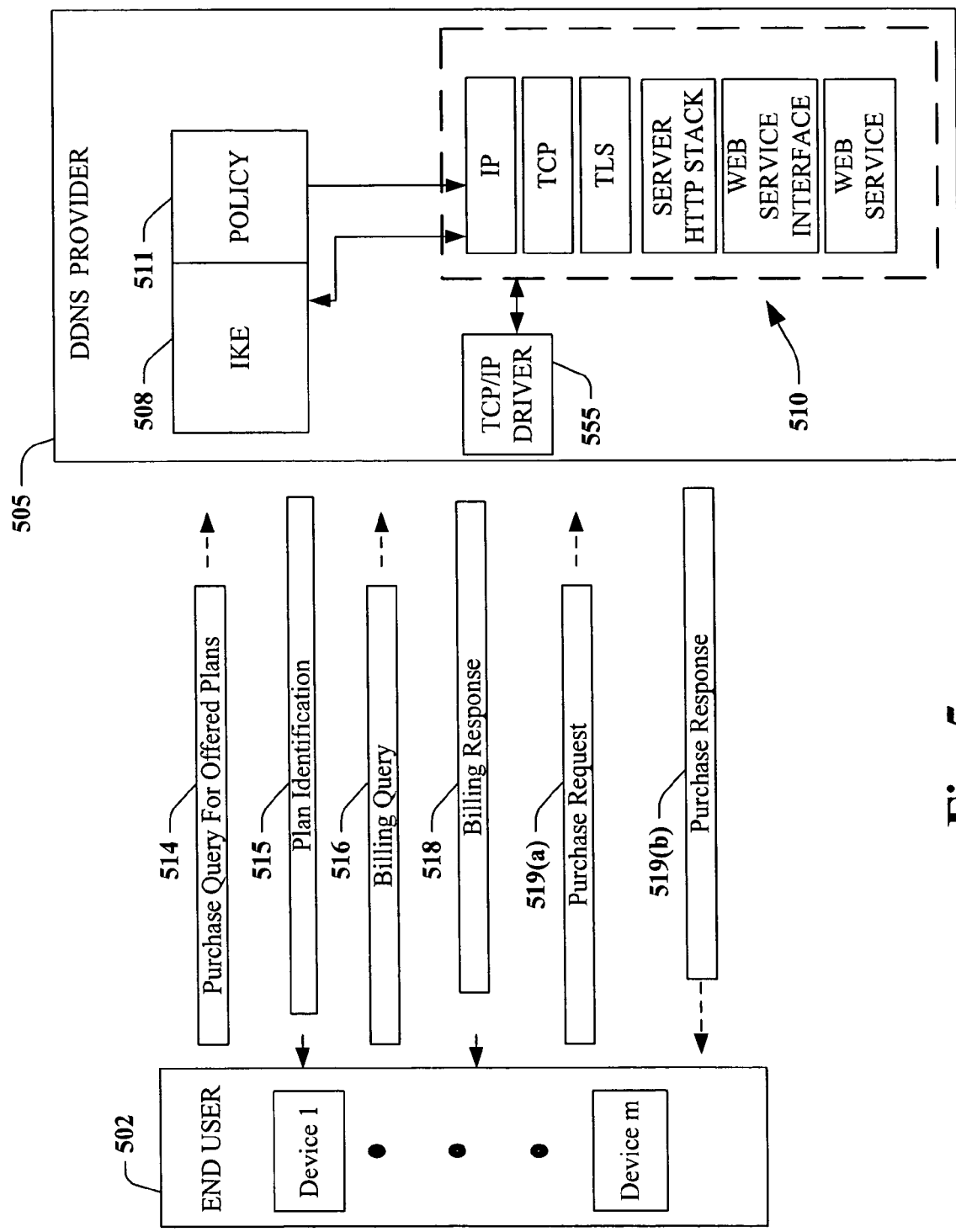
FIG. 5 illustrates a sequence of query steps performed between the end user machine and the DDNS provider in accordance with an aspect of the subject invention.

FIG. 5 illustrates a sequence of query steps between end user machines 502 (1 thru m, where m is an integer) and a DDNS provider 505. The DDNS provider 505 can include a service side secure network stack 510 that further includes an IP layer implementation, a service side TCP layer implementation, a service side TLS, an HTTP stack implementation, a web service provider interface and a web service. The DDNS provider 505 can also include an Internet Key Exchange (IKE) subsystem 508 for securing network traffic between the DDNS provider 505 and the end user devices 502. The DDNS provider 505 can also include policy modules 511 to enable configuration of the IKE subsystems 508. The policy module 511 can also provide security configuration information to the secure network stack 510 which communicate via TCP/IP driver 555 thereby enabling secure network traffic between the DDNS provider 505 and the end user machines 502.

The DDNS provider 505 can register and receive the standardized set of messages for hosting a domain name(s) obtained by a user. For example, at 514 the purchasing component of the standardized schema of the subject invention can query the DDNS provider(s), which are registered for receiving the standardized messages for a purchase query of the various plan offerings. Next, and at 515 a purchase query response identifying the various plans and terms of the service is communicated via the standardized set of messages of the subject invention back to the end user machine 502. Subsequently and at 516, a billing query is transferred to the DDNS provider 505. A response can then be prepared and sent back to the end user 502 machine regarding various billing requirements for hosting the domain name. The received response can then be displayed to a user, via a uniform presentation such that a user enjoys a similar experience, regardless of which DDNS provider the user interacts with. The user can then select a desired plan for purchase, with a purchase request/response pair 519(a) & 519(b) exchanged between the DDNS provider 505 and the end user machine(s) 502. Likewise, a similar sequence for updating an IP address can be instigated between the end user machines 502 and the DDNS provider, wherein the schema of the subject invention can periodically ping the DDNS 505 every time a new IP address is assigned by the ISP. As such, the DDNS provider 505 can resolve the domain name to the new IP address.

In general, the basic function of the DDNS provider 505 is to provide a distributed data base that maps among human readable host names, dynamic IP addresses, and mail routing information. Typically, any DNS name space can be hierarchically organized, so that sub-domains can be locally administered, wherein for any group of computers partaking of the DNS naming scheme there can be a single definitive list of DNS names. The group of computers included in such list is called a zone. A zone could be a top level national domain, a business and the like. Within a zone DNS service for subsidiary zones can be delegated along with a subsidiary domain, and the computer that maintains the master list for a zone is said to have authority for that zone, e.g., will be the primary name server for that zone, there will also be secondaries for that zone. For example, when a client searching for a business related to the end user of the subject invention enters a designated domain name (e.g., enduserbusiness.com), which is being hosted by the DNS provider, a local server associated with the client is queried for such name. If such server does not know about such domain name, it will then ask the root server. The root server can then refer such query to the ".com" server, which in turn refers to the enduserbusinnes.com, which responds with an address.

In such environments, if a user connects to the Internet via DSL, cable modem, or any other method whereby the IP address may change periodically, wherein the user is running some type of internet service (ftp, chat, or webserver) via such connection, then a DDNS can be employed. As such, DDNS can allow machines with IP addresses that change to have permanent domain names on the Internet.

Figure 6:
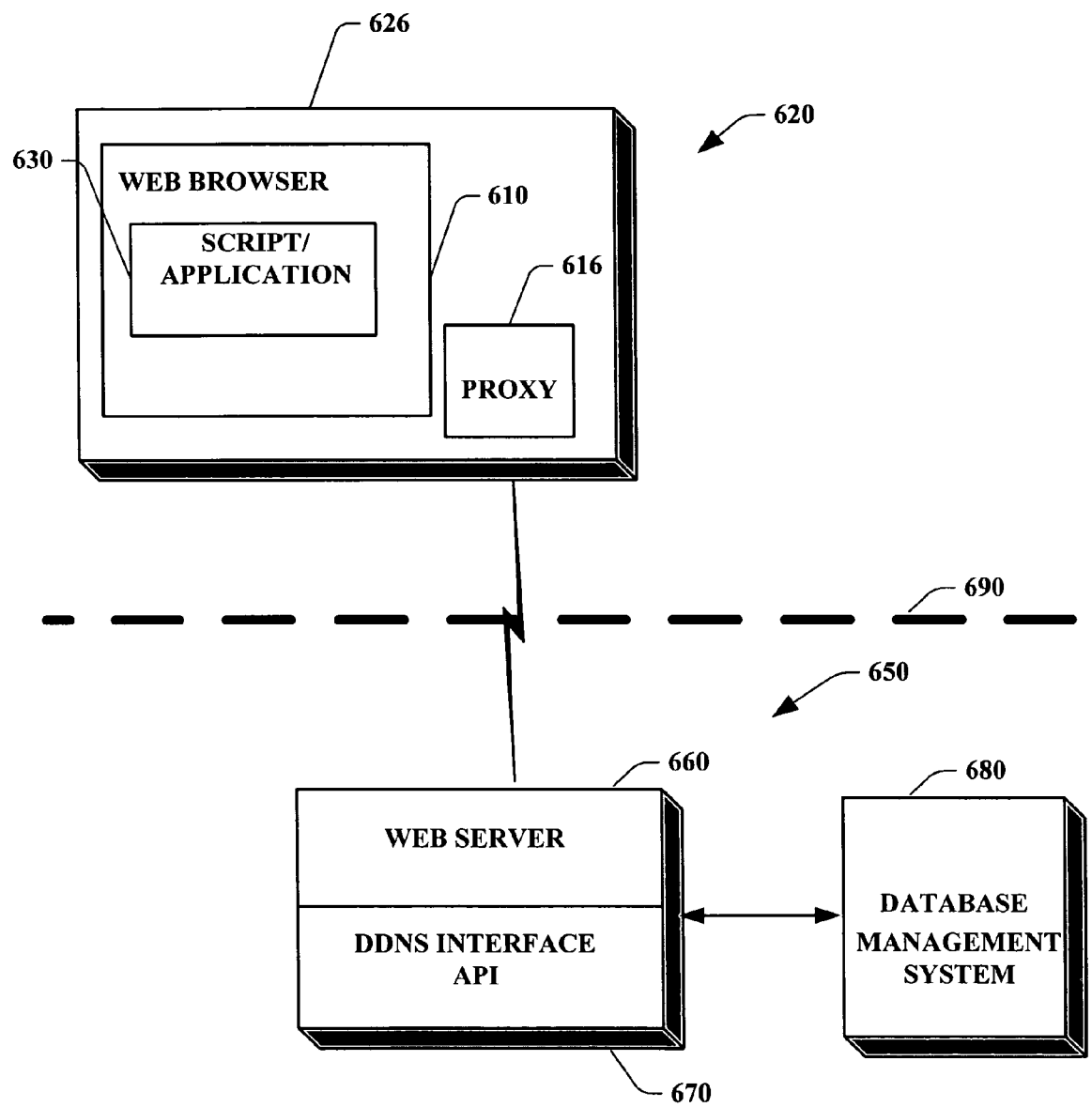
FIG. 6 illustrates an end user device that connects to the DDNS provider in accordance with an aspect of the subject invention.

FIG. 6 illustrates an end user device that connects to the DDNS provider in accordance with an aspect of the subject invention, wherein running on the end user side 620 can be a client process, for example, a web browser 610. Likewise, running on the DDNS provider side 650 can be a corresponding server process, for example, a web server 660. In addition, embedded in the Web Browser 610 can be a script or application 630, and running within the run-time environment 626 of the end user device 620, can exist a proxy 616 for packaging and unpacking data packets formatted in accordance with the standardized messages of the subject invention. Communicating with the DDNS provider can be a database management system (DBMS) 680, which manages access to a Content database of domain names. The DBMS 680 and the database (not shown) can be located in the DDNS provider itself, or can be located remotely on a remote database server (not shown). Running on the Web server 660 can be a DDNS interface Application Program Interface (API) 670, which provides access to the DBMS 680. The end user device 620 and the DDNS provider side 650 can communicate with each other through a network 690, (e.g., the Internet). When the client process, e.g., the Web browser 610, requests a query of service plans from the DDNS provider side 650, the script or application 630 can issue a query, which is sent across the network (e.g., Internet) 690 to DDNS provider side 650, where it is interpreted, by the Web server 660. The end user side 620 request to the DDNS provider side 650 can contain multiple commands, and a response from DDNS provider side 650 can return a plurality of service plan options. The received response can then be displayed to a user, via a uniform presentation such that a user enjoys a similar experience, regardless of which DDNS provider the user interacts with. The invention thus facilitates initial server configurations (e.g., presence of small businesses on the Internet), and on-going maintenance, wherein employing multi vendor components are simplified by using a unified and common message structure. An exemplary XML schema for the status verification component, (as well as for the purchasing component described supra) is presented as part of appendix A-infra.

Figure 7:
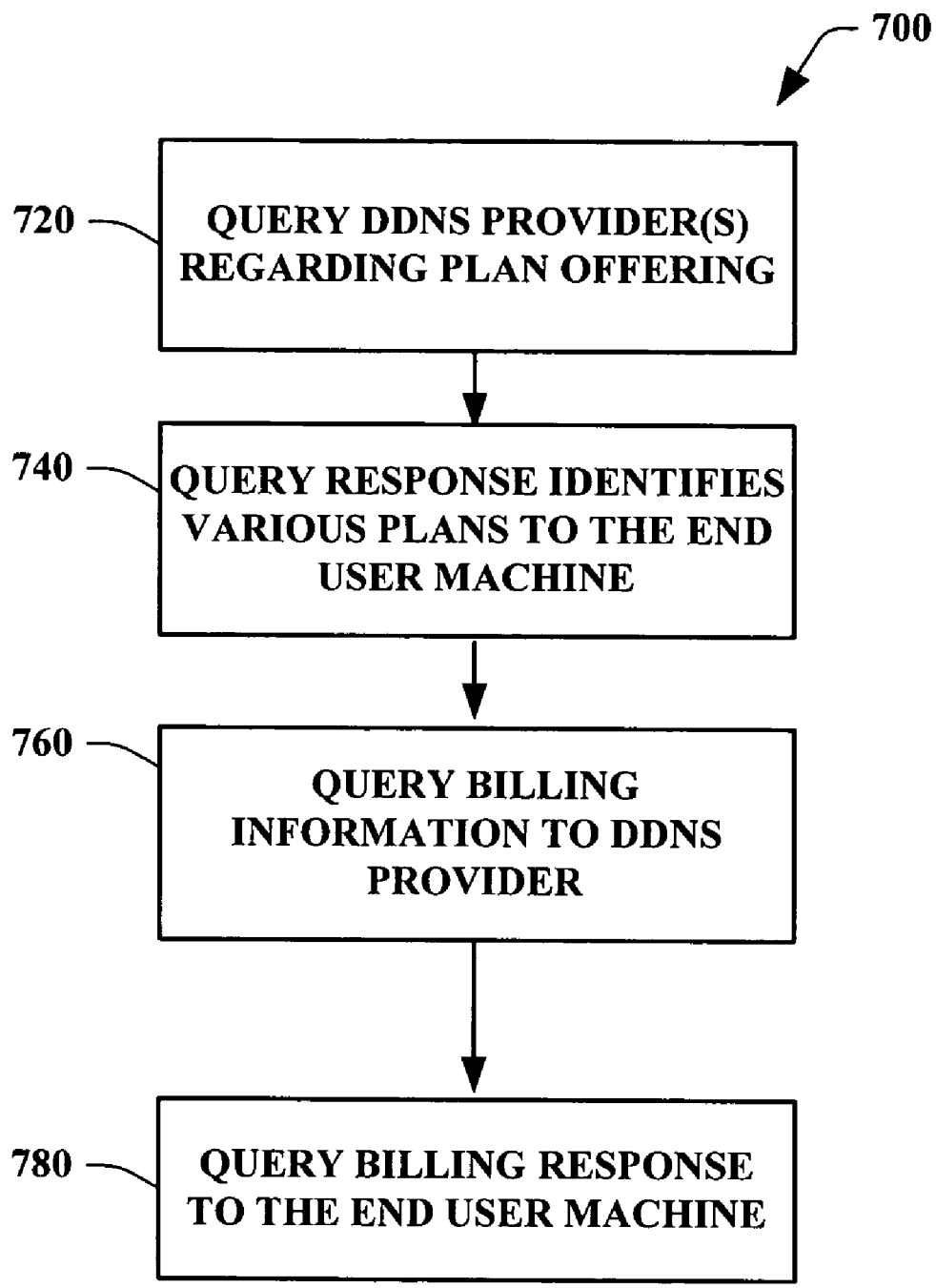
FIG. 7 illustrates a methodology of hosting a domain name with a DDNS provider registered to receive the standardized set of messages in accordance with an aspect of the subject invention.

FIG. 7 illustrates a methodology of hosting a domain name with a DDNS provider registered to receive standardized set of messages in accordance with an aspect of the subject invention. Initially, and at 720 the purchasing component, as part of the standardized message schema of the subject invention, can query the DDNS provider(s) regarding the various plan offerings. In response to such query, and at 740 a purchase query response (e.g., data packets) identifying the various plans and terms of the service is communicated via the standardized set of messages of the subject invention back to the end user machine. Subsequently and at 760, a billing query is transferred to the DDNS provider. A response can then be prepared and sent back to the end user machine regarding various billing requirements for hosting the domain name, at 780. The received response can then be displayed to a user, via a uniform presentation such that a user enjoys a similar experience, regardless of which DDNS provider the user interacts with. The user can then select a desired plan for purchase and initiate presence of its domain name on the web.

While the exemplary method is illustrated and described herein as a series of blocks representative of various events and/or acts, the present invention is not limited by the illustrated ordering of such blocks. For instance, some acts or events may occur in different order and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 8:
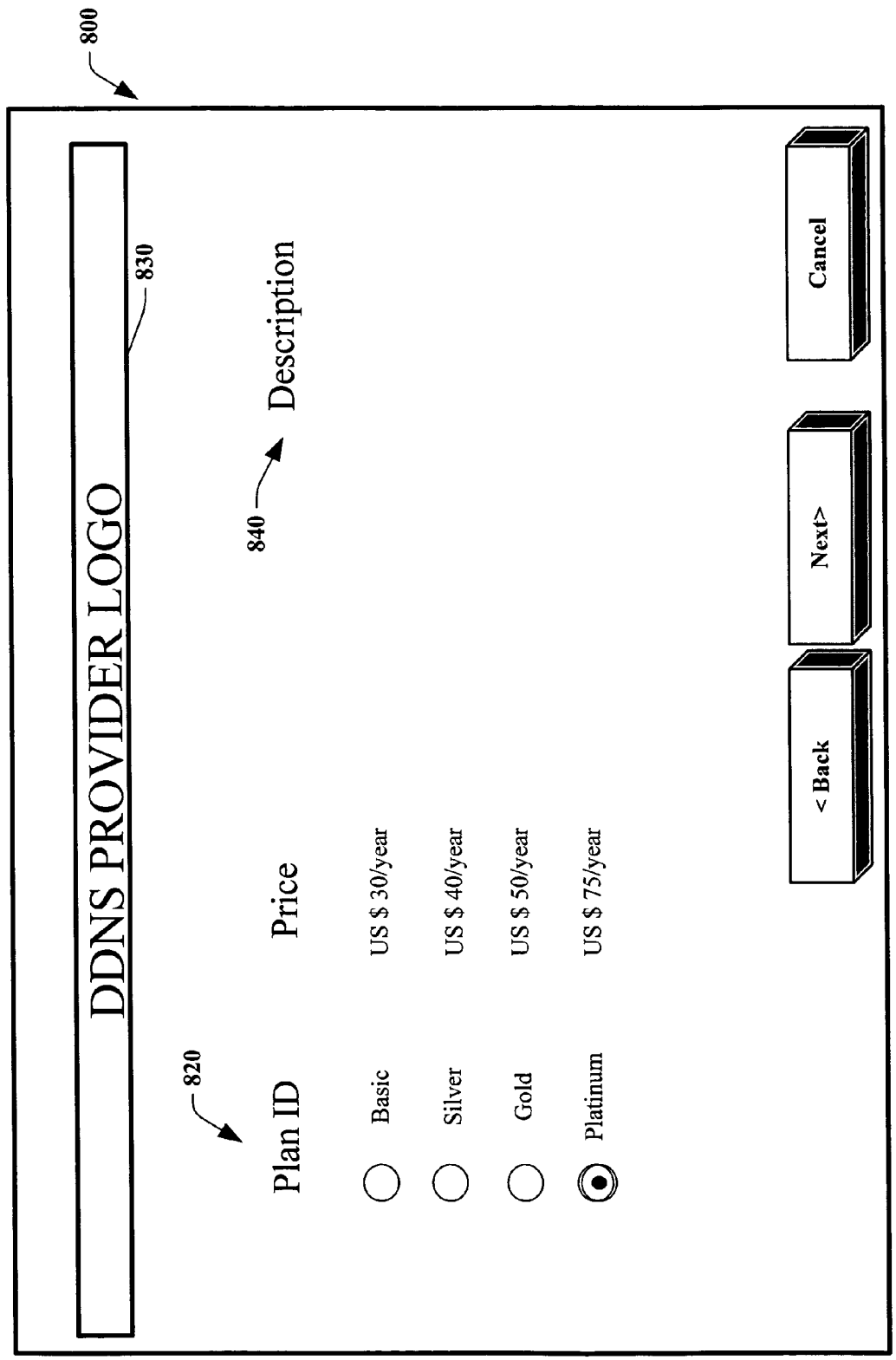
FIG. 8 illustrates an exemplary graphical uniform interface employed for presentation of various plans offered by the plurality of the DDNS providers.

FIG. 8 illustrates an exemplary graphical uniform interface employed for presentation of various plans offered by the plurality of the DDNS providers, wherein the user can then select a desired plan therefrom. Such graphical interface 800 displays returned results and can provide a user with a uniform configuration tool for internet presence. The exemplary user interface (GUI) 800 of the subject invention can be employed to facilitate account generation for hosting of domain name service. Such GUI 800 comprises a identification region 820 for the various plans offered by a DDNS provider. In addition, a space 830 can be reserved on the GUI 800 to display a logo associated with the DDNS provider, with a description section 840 describing the nature of the plans offered. As such, a user can benefit from a similar experience regardless of which DDNS provider the user interacts with. The user can then select a desired plan for purchase.

Figure 9:
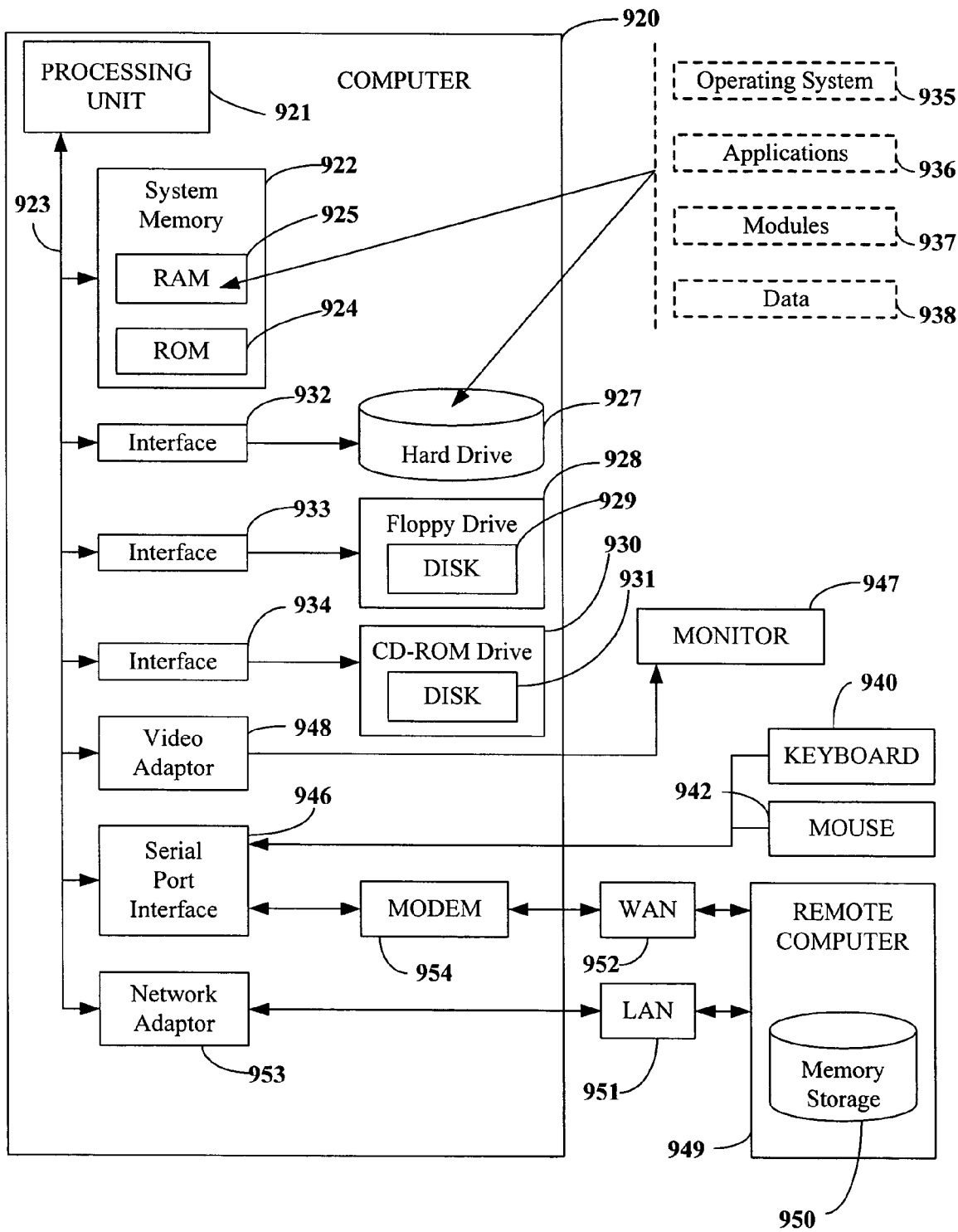
FIG. 9 is a schematic block diagram illustrating a suitable computing environment that can employ various aspects of the subject invention.

Referring now to FIG. 9, a brief, general description of a suitable computing environment on the client as well as the server side is illustrated wherein the various aspects of the subject invention can be implemented. While the invention has been described above in the general context of computer-executable instructions of a computer program that run on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 920, including a processing unit 921, a system memory 922, and a system bus 923 that couples various system components including the system memory to the processing unit 921. The processing unit 921 can be any of various commercially available processors. Dual microprocessors and other multi-processor architectures also can be used as the processing unit 921.

The system bus can be any of several types of bus structure including a memory bus or memory controller, a peripheral bus, and a local bus using any of a variety of commercially available bus architectures. The system memory may include read only memory (ROM) 924 and random access memory (RAM) 925. A basic input/output system (BIOS), containing the basic routines that help to transfer information between elements within the computer 920, such as during start-up, is stored in ROM 924.

The computer 920 further includes a hard disk drive 927, a magnetic disk drive 928, e.g., to read from or write to a removable disk 929, and an optical disk drive 930, e.g., for reading from or writing to a CD-ROM disk 931 or to read from or write to other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide nonvolatile storage of data, data structures, computer-executable instructions, etc. for the computer 920. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 925, including an operating system 935, one or more application programs 936, other program modules 937, and program data 938. The operating system 935 in the illustrated computer can be substantially any commercially available operating system.

A user can enter commands and information into the computer 920 through a keyboard 940 and a pointing device, such as a mouse 942. Other input devices (not shown) can include a microphone, a joystick, a game pad, a satellite dish, a scanner, or the like. These and other input devices are often connected to the processing unit 921 through a serial port interface 946 that is coupled to the system bus, but may be connected by other interfaces, such as a parallel port, a game port, a universal serial bus (USB) or 1394 firewire. A monitor 947 or other type of display device is also connected to the system bus 923 via an interface, such as a video adapter 948. In addition to the monitor, computers typically include other peripheral output devices (not shown), such as speakers and printers.

The computer 920 can operate in a networked environment using logical connections to one or more remote computers, such as a remote computer 949. The remote computer 949 may be a workstation, a server computer, a router, a peer device or other common network node, and typically includes many or all of the elements described relative to the computer 920, although only a memory storage device 950 is illustrated in FIG. 9. The logical connections depicted in FIG. 9 may include a local area network (LAN) 951 and a wide area network (WAN) 952. Such networking environments are commonplace in offices, enterprise-wide computer networks, Intranets and the Internet.

When employed in a LAN networking environment, the computer 920 can be connected to the local network 951 through a network interface or adapter 953. When utilized in a WAN networking environment, the computer 920 generally can include a modem 954, and/or is connected to a communications server on the LAN, and/or has other means for establishing communications over the wide area network 952, such as the Internet. The modem 954, which can be internal or external, can be connected to the system bus 923 via the serial port interface 946. In a networked environment, program modules depicted relative to the computer 920, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 920, unless otherwise indicated. Such acts and operations are sometimes referred to as being computer-executed. It will be appreciated that the acts and symbolically represented operations include the manipulation by the processing unit 921 of electrical signals representing data bits which causes a resulting transformation or reduction of the electrical signal representation, and the maintenance of data bits at memory locations in the memory system (including the system memory 922, hard drive 927, floppy disks 928, and CD-ROM 931) to thereby reconfigure or otherwise alter the computer system's operation, as well as other processing of signals. The memory locations wherein such data bits are maintained are physical locations that have particular electrical, magnetic, or optical properties corresponding to the data bits.

Figure 10:
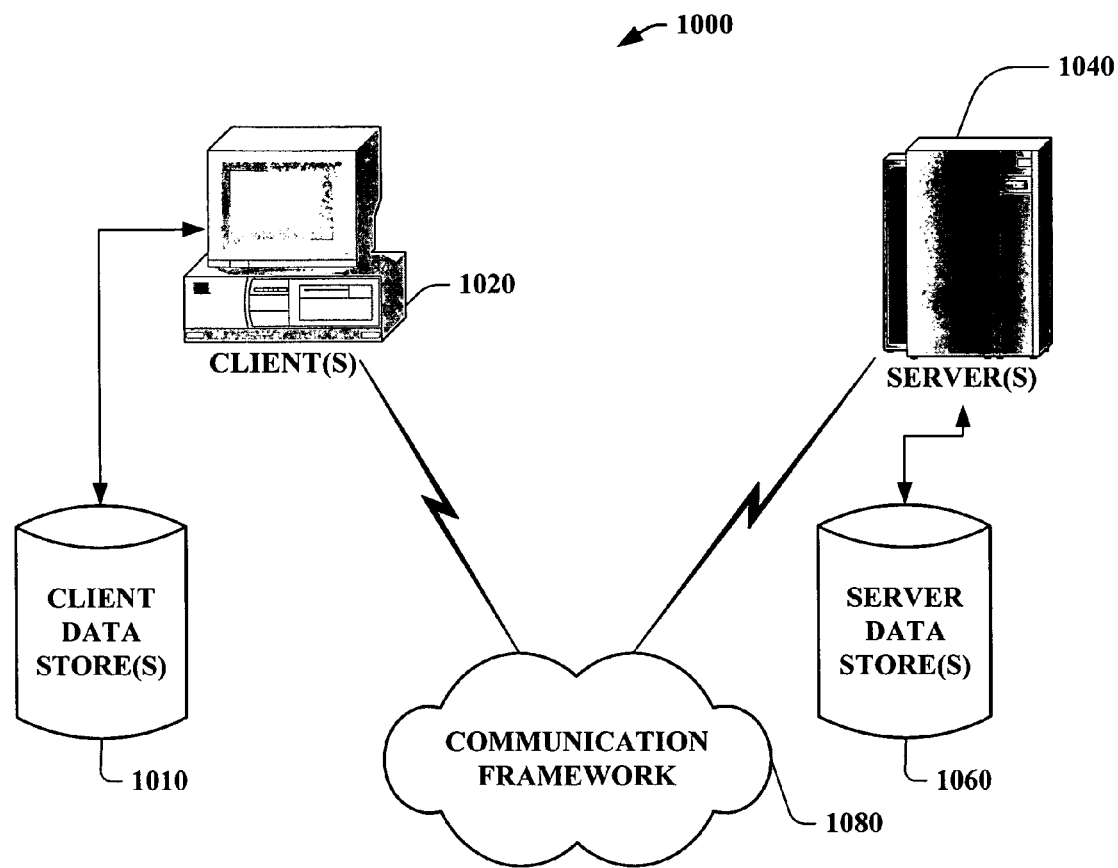
FIG. 10 illustrates a client—DDNS provider system that can employ a messaging schema according to one aspect of the subject invention.

Referring now to FIG. 10, a client—DDNS provider system 1000 that employs a standardized schema according to one aspect of the subject invention is illustrated. The client(s) 1020 can be hardware and/or software (e.g., threads, processes, computing devices). The system 1000 also includes one or more server(s) 1040. The server(s) 1040 can also be hardware and/or software (e.g., threads, processes, computing devices). For example, such servers 1040 can house threads to perform transformations by employing the subject invention. The client 1020 and the server 1040 can communicate, in the form of data packets transmitted according to the subject invention, between two or more computer processes. The client/server can also share the same process. As illustrated, the system 1000 includes a communication framework 1080 that can facilitate communications between the client(s) 1020 and the server(s) 1040. The client(s) 1020 is operationally connected to one or more client data store(s) 1010 that can store information local to the client(s) 1020. Moreover, client 1020 can access and update databases 1060 located on a server computer 1040 running a server process. In one aspect of the subject invention, the communication frame work 1080 can be the Internet, with the client process being a Web browser and the server process being a Web server.

As such, a typical client 1020 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1040 can be university or corporate mainframe computers, or dedicated workstations, and the like.

A sample XML schema that provides an example for the various components according to the subject invention is provided infra, as part of appendix A, and this appendix is to be considered part of this specification describing the invention.

Moreover, although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

APPENDIX A

```
<?xml version="1.0" encoding="utf-8" ?>
<xs:schema
    xmlns:xs="http://www.w3.org/2001/XMLSchema"
targetNamespace="http://www.microsoft.com/provisioning/
DDNSConfigProfile/2004"
xmlns="http://www.microsoft.com/provisioning/DDNSConfigProfile/
2004"
xmlns:ci="http://www.microsoft.com/provisioning/
CoreInternetProfile/2004"
    elementFormDefault="qualified"
    version="1">
    <xs:import
namespace="http://www.microsoft.com/provisioning/
CoreInternetProfile/2004"
schemaLocation="../../CoreInternetProfile/2004/CoreInternetSchema.xsd"
/>
    <xs:import
namespace="http://www.microsoft.com/provisioning/BillingProfile/2004"
schemaLocation="../../BillingProfile/2004/BillingSchema.xsd" />
    <xs:annotation>
        <xs:documentation xml:lang="en" >
            Dynamic DNS Update schema
            Copyright 2004 Microsoft Corporation. All rights reserved.
        </xs:documentation>
    </xs:annotation>
    ---- -->
    <xs:element name="DDNSSetup">
        <xs:complexType>
            <xs:choice>
                <xs:element name="DDNSUpdate" type="DDNSUpdateBase"
/>
                <xs:element name="DDNSPurchase" type=
"DDNSPurchaseBase" />
            </xs:choice>
        </xs:complexType>
    </xs:element>
    <!-- ---------------------------------------------------------
---- -->
    <!-- DDNSUpdate items
-->
    <!-- ---------------------------------------------------------
---- -->
    <xs:complexType name="DDNSUpdateBase" abstract="true">
        <xs:sequence>
            <xs:element name="DomainNameSpace" type=
"ci:strDomainName" minOccurs="1" maxOccurs="1" /> <!-- always
```

APPENDIX A-continued

```
required -->
            <xs:element name="HostName" type="ci:strDomainName"
minOccurs="0" maxOccurs="1" />
            <xs:element name="IPAddress" type="ci:dotQuadIPv4Type"
minOccurs="1" maxOccurs="1" /> <!-- always required -->
            <xs:element name="ProcessingTime" type="xs:positiveInteger"
minOccurs="0" maxOccurs="1" />
            <xs:element name="AuthorizationData" type="ci:authData"
minOccurs="0" maxOccurs="1" /> <!-- always optional -->
            <xs:element name="Response" type="ci:BaseResponseType"
minOccurs="0" maxOccurs="1" />
        </xs:sequence>
    </xs:complexType>
    <xs:complexType name="DDNSUpdateRequest">
        <xs:complexContent>
            <xs:restriction base="DDNSUpdateBase">
                <xs:sequence>
                    <xs:element name="DomainNameSpace"
type="ci:strDomainName" minOccurs="1" maxOccurs="1" />
                    <xs:element name="HostName" type="ci:strDomainName"
minOccurs="0" maxOccurs="1" />
                    <xs:element name="IPAddress"
type="ci:dotQuadIPv4Type" minOccurs="1" maxOccurs="1" />
                    <xs:element name="ProcessingTime"
type="xs:positiveInteger" minOccurs="0" maxOccurs="0" /> <!--
forbidden -->
                    <xs:element name="AuthorizationData"
type="ci:authData" minOccurs="0" maxOccurs="1" />
                    <xs:element name="Response"
type="ci:BaseResponseType" minOccurs="0" maxOccurs="0" /> <!--
forbidden -->
                </xs:sequence>
            </xs:restriction>
        </xs:complexContent>
    </xs:complexType>
    <xs:complexType name="DDNSUpdateResponse">
        <xs:complexContent>
            <xs:restriction base="DDNSUpdateBase">
                <xs:sequence>
                    <xs:element name="DomainNameSpace"
type="ci:strDomainName" minOccurs="1" maxOccurs="1" />
                    <xs:element name="HostName" type="ci:strDomainName"
minOccurs="0" maxOccurs="1" />
                    <xs:element name="IPAddress"
type="ci:dotQuadIPv4Type" minOccurs="1" maxOccurs="1" />
                    <xs:element name="ProcessingTime"
type="xs:positiveInteger" minOccurs="1" maxOccurs="1" /> <!--
required -->
                    <xs:element name="AuthorizationData"
type="ci:authData" minOccurs="0" maxOccurs="1" />
                    <xs:element name="Response"
type="ci:BaseResponseType" minOccurs="1" maxOccurs="1" /> <!--
required -->
                </xs:sequence>
            </xs:restriction>
        </xs:complexContent>
    </xs:complexType>
    <!-- ---------------------------------------------------------
---- -->
    <!-- DDNSPurchase items
-->
    <!-- ---------------------------------------------------------
---- -->
    <!-- Purchase Base -->
    <xs:complexType name="DDNSPurchaseBase" abstract="true">
        <xs:sequence>
            <xs:element name="RequestType" type="strDDNSRequestType"
minOccurs="1" maxOccurs="1" /> <!-- always required -->
            <xs:element name="TransactionGUID" type="ci:strGuid"
minOccurs="1" maxOccurs="1" /> <!-- always required -->
            <xs:element name="DomainNameSpace"
type="ci:strDomainName" minOccurs="1" maxOccurs="1" /> <!-- always
required -->
            <xs:element name="AuthorizationData" type="ci:authData"
minOccurs="0" maxOccurs="1" /> <!-- always optional -->
            <xs:element name="DnsServers" type="ci:DnsType"
minOccurs="0" maxOccurs="1" />
            <xs:element name="PlanID" type="xs:positiveInteger"
minOccurs="0" maxOccurs="1" />
            <xs:element name="PromotionalCode" type="ci:strMax255"
```

APPENDIX A-continued

```
minOccurs="0" maxOccurs="1" />
        <xs:element name="AutoRenewal" type="xs:boolean"
minOccurs="0" maxOccurs="1" />
        <xs:element name="BillingInfo" type="bi:BillingInfoType"
minOccurs="0" maxOccurs="1" />
        <xs:element name="OrderNumber" type="xs:string"
minOccurs="0" maxOccurs="1" />
        <xs:element name="Response" type="DDNSResponseType"
minOccurs="0" maxOccurs="1" />
    </xs:sequence>
</xs:complexType>
<!-- Purchase -->
<xs:complexType name="DDNSHostingPurchaseRequestType">
    <xs:complexContent>
        <xs:restriction base="DDNSPurchaseBase">
            <xs:sequence>
                <xs:element name="RequestType"
type="strRequestType" minOccurs="1" maxOccurs="1" fixed=
"Purchase" />
                <xs:element name="TransactionGUID"
type="ci:strGuid" minOccurs="1" maxOccurs="1" />
                <xs:element name="DomainNameSpace"
type="ci:strDomainName" minOccurs="1" maxOccurs="1" />
                <xs:element name="AuthorizationData"
type="ci:authData" minOccurs="0" maxOccurs="1" />
                <xs:element name="DnsServers"
type="ci:DnsType" minOccurs="0" maxOccurs="0" />
                <xs:element name="PlanID"
type="xs:positiveInteger" minOccurs="1" maxOccurs="1" />
                <xs:element name="PromotionalCode"
type="ci:strMax255" minOccurs="0" maxOccurs="1" /> <!--
optional -->
                <xs:element name="AutoRenewal"
type="xs:boolean" minOccurs="1" maxOccurs="1" />
-->
                <xs:element name="OldHostingService"
type="ci:strDomainName" minOccurs="0" maxOccurs="0" /> <!--
forbidden -->
                <xs:element name="BillingInfo"
type="bi:BillingInfoType" minOccurs="1" maxOccurs="1" /> <
                <xs:element name="OrderNumber"
type="xs:string" minOccurs="0" maxOccurs="0" />
                <xs:element name="Response"
type="DDNSResponseType" minOccurs="0" maxOccurs="0" />
            </xs:sequence>
        </xs:restriction>
    </xs:complexContent>
</xs:complexType>
<xs:complexType name="DDNSHostingPurchaseResponseType">
    <xs:complexContent>
        <xs:restriction base="DDNSPurchaseBase">
            <xs:sequence>
                <xs:element name="RequestType"
type="strRequestType" minOccurs="1" maxOccurs="1" fixed=
"Purchase" />
                <xs:element name="TransactionGUID"
type="ci:strGuid" minOccurs="1" maxOccurs="1" />
                <xs:element name="DomainNameSpace"
type="ci:strDomainName" minOccurs="1" maxOccurs="1" />
                <xs:element name="AuthorizationData"
type="ci:authData" minOccurs="0" maxOccurs="1" />
                <xs:element name="DnsServers"
type="ci:DnsType" minOccurs="1" maxOccurs="1" />
                <xs:element name="PlanID"
type="xs:positiveInteger" minOccurs="1" maxOccurs="1" />
                <xs:element name="PromotionalCode"
type="ci:strMax255" minOccurs="0" maxOccurs="1" /> <!--
optional -->
                <xs:element name="AutoRenewal"
type="xs:boolean" minOccurs="1" maxOccurs="1" />
                <xs:element name="OldHostingService"
type="ci:strDomainName" minOccurs="0" maxOccurs="0" /> <!--
forbidden -->
                <xs:element name="BillingInfo"
type=""bi:BillingInfoType" minOccurs="1" maxOccurs="1" /> <!--
                <xs:element name="OrderNumber" type="xs:string"
minOccurs="0" maxOccurs="1" /> <!-- optional -->
                <xs:element name="Response"
type="DDNSResponseType" minOccurs="1" maxOccurs="1" /> <!--
            </xs:sequence>
        </xs:restriction>
    </xs:complexContent>
</xs:complexType>
<!-- Purchase Query -->
<xs:complexType name="DDNSHostingPurchaseQueryRequest
Type">
    <xs:complexContent>
        <xs:restriction base="DDNSPurchaseBase">
            <xs:sequence>
                <xs:element name="RequestType"
type="strRequestType" minOccurs="1" maxOccurs="1" fixed=
"PurchaseQuery" />
                <xs:element name="TransactionGUID"
type="ci:strGuid" minOccurs="1" maxOccurs="1" />
                <xs:element name="DomainNameSpace"
type="ci:strDomainName" minOccurs="1" maxOccurs="1" />
                <xs:element name="AuthorizationData"
type="ci:authData" minOccurs="0" maxOccurs="1" />
                <xs:element name="DnsServers"
type="ci:DnsType" minOccurs="0" maxOccurs="0" />
                <xs:element name="PlanID"
type="xs:positiveInteger" minOccurs="0" maxOccurs="0" />
                <xs:element name="PromotionalCode"
type="ci:strMax255" minOccurs="0" maxOccurs="1" /> <!--
optional -->
                <xs:element name="AutoRenewal"
type="xs:boolean" minOccurs="0" maxOccurs="0" />
                <xs:element name="OldHostingService"
type="ci:strDomainName" minOccurs="0" maxOccurs="0" />
                <xs:element name="BillingInfo" type="bi:BillingInfoType"
minOccurs="0" maxOccurs="0" />
                <xs:element name="OrderNumber" type="xs:string"
minOccurs="0" maxOccurs="0" /> <!-- forbidden -->
                <xs:element name="Response"
type="DDNSResponseType" minOccurs="0" maxOccurs="0" /> <
            </xs:sequence>
        </xs:restriction>
    </xs:complexContent>
</xs:complexType>
<xs:complexType name="DDNSHostingPurchaseQueryResponse
Type">
    <xs:complexContent>
        <xs:restriction base="DDNSPurchaseBase">
            <xs:sequence>
                <xs:element name="RequestType"
type="strRequestType" minOccurs="1" maxOccurs="1" fixed=
"PurchaseQuery" />
                <xs:element name="TransactionGUID"
type="ci:strGuid" minOccurs="1" maxOccurs="1" />
                <xs:element name="DomainNameSpace"
type="ci:strDomainName" minOccurs="1" maxOccurs="1" />
                <xs:element name="AuthorizationData"
type="ci:authData" minOccurs="0" maxOccurs="1" />
                <xs:element name="DnsServers"
type="ci:DnsType" minOccurs="0" maxOccurs="1" />
    <!-- optional -->
                <xs:element name="PlanID"
type="xs:positiveInteger" minOccurs="0" maxOccurs="0" />
                <xs:element name="PromotionalCode"
type="ci:strMax255" minOccurs="0" maxOccurs="1" /> <!--
optional -->
                <xs:element name="AutoRenewal"
type="xs:boolean" minOccurs="0" maxOccurs="0" />
                <xs:element name="OldHostingService"
type="ci:strDomainName" minOccurs="0" maxOccurs="0" /> <!--
forbidden -->
                <xs:element name="BillingInfo"
type="bi:BillingInfoType" minOccurs="0" maxOccurs="0" />
                <xs:element name="OrderNumber" type="xs:string"
minOccurs="0" maxOccurs="0" />
                <xs:element name="Response" type="DDNSResponseType"
minOccurs="1" maxOccurs="1" /> <!-- required -->
            </xs:sequence>
        </xs:restriction>
    </xs:complexContent>
</xs:complexType>
<!-- Renew -->
<xs:complexType name="DDNSHostingRenewRequestType"?
    <xs:complexContent>
        <xs:restriction base="DDNSPurchaseBase">
```

APPENDIX A-continued

```
        <xs:sequence>
            <xs:element name="RequestType"
type="strRequestType" minOccurs="1" maxOccurs="1" fixed="Renew"
/>
            <xs:element name="TransactionGUID"
type="ci:strGuid" minOccurs="1" maxOccurs="1" />
            <xs:element name="DomainNameSpace"
type="ci:strDomainName" minOccurs="1" maxOccurs="1" />
            <xs:element name="AuthorizationData"
type="ci:authData" minOccurs="0" maxOccurs="1" />
            <xs:element name="DnsServers"
type="ci:DnsType" minOccurs="0" maxOccurs="0" />
            <xs:element name="PlanID"
type="xs:positiveInteger" minOccurs="0" maxOccurs="1" />
            <xs:element name="PromotionalCode"
type="ci:strMax255" minOccurs="0" maxOccurs="1" /> <!--
optional -->
            <xs:element name="AutoRenewal"
type="xs:boolean" minOccurs="1" maxOccurs="1" />
        <!-- required -->
            <xs:element name="OldHostingService"
type="ci:strDomainName" minOccurs="0" maxOccurs="0" /> <!--
forbidden -->
            <xs:element name="BillingInfo"
type="bi:BillingInfoType" minOccurs="1" maxOccurs="1" /> <!--
required -->
            <xs:element name="OrderNumber"
type="xs:string" minOccurs="0" maxOccurs="1" /> <!--
optional -->
            <xs:element name="Response"
type="DDNSResponseType" minOccurs="0" maxOccurs="0" /> <!--
forbidden -->
        </xs:sequence>
    </xs:restriction>
</xs:complexContent>
</xs:complexType>
<xs:complexType name="DDNSHostingRenewResponseType">
    <xs:complexContent>
        <xs:restriction base="DDNSPurchaseBase">
            <xs:sequence>
                <xs:element name="RequestType"
type="strRequestType" minOccurs="1" maxOccurs="1" fixed="Renew"
/>
                <xs:element name="TransactionGUID"
type="ci:strGuid" minOccurs="1" maxOccurs="1" />
                <xs:element name="DomainNameSpace"
type="ci:strDomainName" minOccurs="1" maxOccurs="1" />
                <xs:element name="AuthorizationData"
type="ci:authData" minOccurs="0" maxOccurs="1" />
                <xs:element name="DnsServers"
type="ci:DnsType" minOccurs="1" maxOccurs="1" />
            <!-- required -->
                <xs:element name="PlanID"
type="xs:positiveInteger" minOccurs="0" maxOccurs="1" />
            <!-- optional -->
                <xs:element name="PromotionalCode"
type="ci:strMax255" minOccurs="0" maxOccurs="1" /> <!--
optional -->
                <xs:element name="AutoRenewal"
type="xs:boolean" minOccurs="1" maxOccurs="1" />
            <!-- required -->
                <xs:element name="OldHostingService"
type="ci:strDomainName" minOccurs="0" maxOccurs="0" /> <!--
forbidden -->
                <xs:element name="BillingInfo"
type="bi:BillingInfoType" minOccurs="1" maxOccurs="1" /> <!--
required -->
                <xs:element name="OrderNumber"
type="xs:string" minOccurs="0" maxOccurs="1" /> <!--
optional -->
                <xs:element name="Response"
type="DDNSResponseType" minOccurs="1" maxOccurs="1" /> <!--
required -->
            </xs:sequence>
        </xs:restriction>
    </xs:complexContent>
</xs:complexType>
<!--Status -->
<xs:complexType name="DDNSHostingStatusQueryRequestType">
    <xs:complexContent>
        <xs:restriction base="DDNSPurchaseBase">
            <xs:sequence>
                <xs:element name="RequestType"
type="strRequestType" minOccurs="1" maxOccurs="1" fixed=
"StatusQuery" />
                <xs:element name="TransactionGUID"
type="ci:strGuid" minOccurs="1" maxOccurs="1" />
                <xs:element name="DomainNameSpace"
type="ci:strDomainName" minOccurs="1" maxOccurs="1" />
                <xs:element name="AuthorizationData"
type="ci:authData" minOccurs="0" maxOccurs="1" />
                <xs:element name="DnsServers"
type="ci:DnsType" minOccurs="0" maxOccurs="0" />
            <!-- forbidden -->
                <xs:element name="PlanID"
type="xs:positiveInteger" minOccurs="0" maxOccurs="0" />
            <!-- forbidden -->
                <xs:element name="PromotionalCode"
type="ci:strMax255" minOccurs="0" maxOccurs="0" /> <!--
forbidden -->
                <xs:element name="AutoRenewal"
type="xs:boolean" minOccurs="0" maxOccurs="0" />
            <!-- forbidden -->
                <xs:element name="OldHostingService"
type="ci:strDomainName" minOccurs="0" maxOccurs="0" /> <!--
forbidden -->
                <xs:element name="BillingInfo"
type="bi:BillingInfoType" minOccurs="0" maxOccurs="0" /> <!--
forbidden -->
                <xs:element name="OrderNumber"
type="xs:string" minOccurs="0" maxOccurs="1" /> <!--
optional -->
                <xs:element name="Response"
type="DDNSResponseType" minOccurs="0" maxOccurs="0" /> <!--
forbidden -->
            </xs:sequence>
        </xs:restriction>
    </xs:complexContent>
</xs:complexType>
<xs:complexType name="DDNSHostingStatusQueryType">
    <xs:complexContent>
        <xs:restriction base="DDNSPurchaseBase">
            <xs:sequence>
                <xs:element name="RequestType"
type="strRequestType" minOccurs="1" maxOccurs="1" fixed=
"StatusQuery" />
                <xs:element name="TransactionGUID"
type="ci:strGuid" minOccurs="1" maxOccurs="1" />
                <xs:element name="DomainNameSpace"
type="ci:strDomainName" minOccurs="1" maxOccurs="1" />
                <xs:element name="AuthorizationData"
type="ci:authData" minOccurs="0" maxOccurs="1" />
                <xs:element name="DnsServers"
type="ci:DnsType" minOccurs="1" maxOccurs="1" />
                <xs:element name="PlanID"
type="xs:positiveInteger" minOccurs="0" maxOccurs="1" />
            <!-- optional -->
                <xs:element name="PromotionalCode"
type="ci:strMax255" minOccurs="0" maxOccurs="0" />
                <xs:element name="AutoRenewal" type="xs:boolean"
minOccurs="0" maxOccurs="1" /> <!-- required -->
                <xs:element name="OldHostingService"
type="ci:strDomainName" minOccurs="0" maxOccurs="0" /> <!--
forbidden -->
                <xs:element name="BillingInfo" type=
"bi:BillingInfoType" minOccurs="0" maxOccurs="0" /> <!--
forbidden -->
                <xs:element name="OrderNumber"
type="xs:string" minOccurs="0" maxOccurs="1" /> <!--
optional -->
                <xs:element name="Response"
type="DDNSResponseType" minOccurs="1" maxOccurs="1" /> <!--
required -->
            </xs:sequence>
        </xs:restriction>
    </xs:complexContent>
</xs:complexType>
<xs:simpleType name="strDDNSRequestType">
    <xs:restriction base="xs:string"?
        <xs:enumeration value="Purchase" />
        <xs:enumeration value="Renew" />
```

APPENDIX A-continued

```
            <xs:enumeration value="PurchaseQuery" />
            <xs:enumeration value="StatusQuery" />
        </xs:restriction>
    </xs:simpleType>
    <!-- ------------------------------------------------------------
    -->
    <!-- Global types
    -->
    <!-- ------------------------------------------------------------
    -->
    <xs:complexType name="DDNSResponseType">
        <xs:complexContent>
            <xs:extension base="ci:BaseResponseType">
                <xs:sequence>
                    <xs:element name="Expiration" type="xs:date"
minOccurs="0" maxOccurs="1" />
                    <xs:element name="PlanInfo" type="ci:PlanInfoType"
minOccurs="0" maxOccurs="16" /> <!-- no more than 16 plans -->
                </xs:sequence>
            </xs:extension>
        </xs:complexContent>
    </xs:complexType>
</xs:schema>
```

What is claimed is:

1. A system that facilitates a user interaction with Dynamic Domain Name Service (DDNS) providers comprising:
a processor that executes the following computer executable components stored on a computer readable medium:
a standardized message schema exchanged between a plurality of DDNS providers and a machine of the user, the standardized message schema defining an expression of a shared vocabulary between a first DDNS provider and the machine of the user, and the standardized message schema further defining an expression of a second different shared vocabulary between a second DDNS provider and the machine of the user such that the standardized message schema enables a presentation of one or more service plans from the first DDNS provider and the second DDNS provider in a uniform presentation that is understood by the machine of the user regardless of the vocabulary used by each of the plurality of DDNS providers, the standardized message schema comprising:
a purchasing component that:
automatically queries each of the plurality of DDNS providers for a list of plan offerings and terms of service for purchase of a domain name,
characterizes the terms of service,
displays each of the plan offerings and terms of service from each of the plurality of DDNS providers via the uniform presentation,
sends a billing query to at least one of the DDNS providers and receives a response from the at least one DDNS provider regarding billing requirements for hosting the domain name, and
sends a purchase request to a selected DDNS provider and receives a purchase response associated with the domain name; and
a status verifying component that detects a change in an IP address assigned to the domain name associated with the user machine, provides an update of the change to the selected DDNS provider, and verifies the update.

2. The system of claim 1, wherein each terms of service include at least one of a plan selection, a renewal option, a promotional call or a billing plan.

3. The system of claim 1, the purchasing component further queries a third DDNS provider for terms of service, characterizes the terms of service, and displays the characterized terms of service in the uniform presentation, independent of the third DDNS provider.

4. A method of facilitating selection of a DDNS provider to host a domain name for a user comprising:
employing one or more processors to execute computer readable instructions stored in a computer readable medium to perform the following acts:
automatically querying a plurality of DDNS providers including a first and second DDNS provider for service agreements for a plurality of plans for hosting a domain name via a standardized message schema between the DDNS providers and a user machine, the standardized message schema defining at least an expression of a shared vocabulary between the first DDNS provider and the user machine and an expression of a second different shared vocabulary between the second DDNS provider and the user machine such that the standardized message schema enables a presentation of one or more service agreements for a plurality of plans from the plurality of DDNS providers in a uniform format that is understood by the user machine regardless of the vocabulary used by each of the DDNS providers;
sending a purchase query for offered plans to each of the DDNS providers;
receiving a plan identification from each of the DDNS providers;
sending a billing query to each of the DDNS providers;
receiving a response to the billing query from each of the DDNS providers;
presenting a set of terms of service from each of the service agreements from each of the DDNS providers in the uniform format;
selecting a plan from a selected DDNS provider;
sending a purchase request to the selected DDNS provider;
providing the selected DDNS provider with the domain name verifying, a status of a dynamic IP address associated with the user machine the standardized message schema;
receiving a purchase response from the selected DDNS provider;
detecting a change in an IP address assigned to the domain name by an Internet Service Provider (ISP); and
updating an IP address associated with the domain name in the selected DDNS provider to the detected changed IP address.

5. The method of claim 4, further comprising receiving an offer containing a service agreement from at least one DDNS provider.

6. The method of claim 4, further comprising receiving a user input for selection of a DDNS provider.

7. The method of claim 4, the terms of service include at least one of a plan selection, a renewal option, a promotional call or a billing plan.

8. The method of claim 4, further comprising sending a billing query to the selected DDNS provider.

9. The method of claim 8, further comprising receiving a response to the billing query.

10. A computer readable medium having encoded thereon computer executable instructions which, when executed upon one or more processors, perform the method of claim 4.

11. The computer-readable medium of claim 10, further comprising instructions for providing a language hint to the selected DDNS provider.

12. The computer-readable medium of claim 10, wherein the service agreement includes renewal options.

13. The computer readable medium of claim 10, further comprising instructions for providing for a transfer of the domain name from another DDNS provider.

* * * * *